United States Patent
Buecheler et al.

[15] 3,679,685
[45] July 25, 1972

[54] ESTERS OF 2-(β-CARBOXYETHYL)AMINO-3,4-PHTHALOYLHENZACRIDONE

[72] Inventors: Paul Buecheler, Reinach/Basel-Land; Fred Mueller, Muchenstein/Basel-Land, both of Switzerland

[73] Assignee: Sandoz Ltd., Basel, Switzerland

[22] Filed: Feb. 12, 1970

[21] Appl. No.: 10,992

Related U.S. Application Data

[63] Continuation-in-part of Ser. No. 578,121, Sept. 9, 1966, abandoned.

[30] Foreign Application Priority Data

Sept. 15, 1965 Switzerland ..........................12819/65

[52] U.S. Cl.....................................260/276, 8/55, 260/277, 260/376
[51] Int. Cl. .........................................................C07d 39/00
[58] Field of Search..........................................260/276, 277

[56] References Cited

UNITED STATES PATENTS

| | | |
|---|---|---|
| 2,481,744 | 9/1949 | Heslop....................................260/276 |
| 3,299,071 | 1/1967 | Fitzpatrick.............................260/276 |
| 3,360,524 | 12/1967 | Schener.................................260/277 |
| 3,436,401 | 4/1969 | Pfister.................................260/276 X |

FOREIGN PATENTS OR APPLICATIONS

| | | |
|---|---|---|
| 1,157,017 | 7/1969 | Great Britain.........................260/276 |
| 1,157,018 | 7/1969 | Great Britain.........................260/276 |
| 944,513 | 12/1963 | Great Britain.........................260/276 |

*Primary Examiner*—Donald G. Daus
*Attorney*—Littlepage, Quaintance, Wray & Aisenberg

[57] ABSTRACT

Phthaloylbenzacridone disperse dyes, having an alkoxycarbonyl-alkylamino-substituent in an ortho-position, are suitable for dyeing, padding and printing fiber or filaments of hydrophobic, synthetic or semi-synthetic, high molecular organic substances.

12 Claims, No Drawings

ESTERS OF 2-(β-CARBOXYETHYL)AMINO-3,4-PHTHALOYLHENZACRIDONE

This application is a Continuation-in-Part of application Ser. No. 578,121, filed Sept. 9, 1966, and now abandoned. This invention relates to dyes of the phthaloylbenzacridone series which have the formula

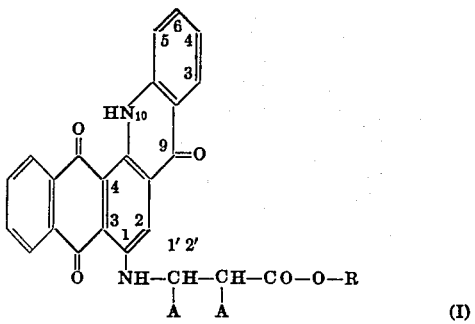

where R represents hydrogen cyclohexyl lower alkyl, unsubstituted or substituted by hydroxy, lower alkoxy, lower alkoxyalkoxy or phenyl, one A represents a hydrogen atom and the other A a hydrogen atom or the methyl group.

The term "lower" is for radicals having not more than six carbon atoms.

The substituent R represents, preferably, alkyl which has one to six carbon atoms and is either unsubstituted or substituted by hydroxy, alkoxy having one to four carbon atoms, alkoxyalkoxy having two to four carbon atoms, or phenyl.

The compounds of formula (I) are produced by reacting, in either order, 1 mole of a compound of the formula

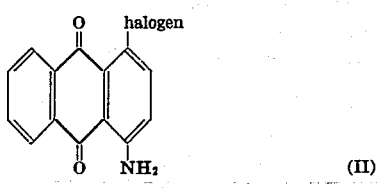

with 1 mole of a compound of the formula

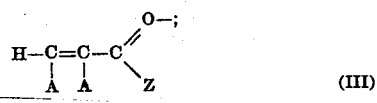

where Z represents the group —OR or —NH$_2$, and with 1 mole of anthranilic acid and, if Z means the group —NH$_2$, it is converted into the free acid or the ester, preferably in the course of the condensation reaction.

In formula (III), the symbols A have the aforestated meanings and halogen in formula (II) means a chlorine or bromine atom.

The dyes of formula (I), used as disperse dyes, give brilliant blue-green dyeings on textiles of linear polyester fiber. They can also be used for the mass coloration of plastics and synthetic resins free from or containing organic solvents and for the spin dyeing of the cellulose acetate. 2-Amino-3,4-phthaloybenzacridone itself and most of the derivatives of this dye show poor build-up on synthetic fibers, especially polyester fibers. The 2-carbonylethylamino-3,4-phthaloylbenzacridone derivatives of the present invention, however, are highly suitable for dyeing and printing textile materials and other products made of hydrophobic organic substances.

The reaction of an anthraquinone derivative of formula (II) with an acrylic acid derivative of formula (III) is carried out with advantage in strong sulphuric acid solution at temperatures of 20° to 130° C. The phthaloylbenzacridone derivatives of the formula

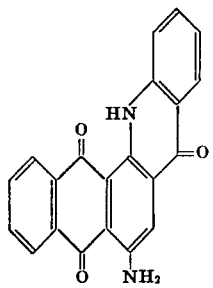

can be reacted with a suitable acrylic acid derivative in the same manner.

The reaction with anthranilic acid of an anthraquinone derivative of formula (II) or of an anthraquinone derivative previously condensed with acrylic acid is carried out by the method familiar to the organic chemist; from the carbon atom 1 of the anthraquinone derivative a bond with the amino nitrogen of the anthranilic acid is formed with cleavage of hydrogen halide. This reaction takes place in inert solvents, preferably nitrobenzene or a higher alcohol, in the presence of an acid-binding agent, such as alkali acetate and at temperatures of 100° to 160° C. Ring closure to form phthaloylbenzacridone is effected in a strong mineral acid, such as polyphosphoric, concentrated sulfphuric, fuming sulphuric or chlorosulphonic acid, or with phosphorus trichloride, phosphorus pentachloride or phosphorus oxychloride. To isolate the dyes, they are precipitated from the solution by dilution or neutralization.

The dyes are soluble in the commonly used organic solvents, such as chlorobenzene and nitrobenzene and in other polar solvents, such as the alcohols and ketones of higher molecular weight.

With these dyes, which are insoluble in water, linear aromatic polyester fibers can be dyed, pad dyed or printed in the form of filament, loose fiber, yarn, knitted goods or woven fabric. On linear aromatic polyesters, for example polyethylene terephthalate or the condensation product of terephthalic acid and 1,4-bis-(hydroxymethyl)-cyclohexanone, the new dyes give blue-green dyeings of brilliant shade and very good fastness to light, wet tests, especially washing, water, chlorinated swimming pool water, sea water and perspiration, and to dry cleaning, rubbing chlorine, peroxide, hydrochlorite, cross dyeing and gas fumes, together with excellent stability to pleating, sublimation and thermofixation. Hitherto it has been necessary to use mixtures of dyes to produce green shades on polyester fibers and, in most cases, these dyeings are of dull shade and often without sufficient fastness in some important properties, such as light, gas fume fading, sublimation and thermofixation.

By using mixtures of the dyes of this invention, if necessary with addition of 2-amino-3,4-phthaloylbenzacridone, the exhaustion and build-up properties can be further improved. It is advisable to convert the dyes into dyeing preparations before use. For this purpose they are comminuted, for example by grinding, until the average particle size is about 0.01 to 10 microns with the bulk of the particles about 0.1 to 5 microns. Comminution can be carried out in the presence of dispersants and, if necessary, fillers and with a diluent. After comminution the finely divided dye preparations are dried in a vacuum, jet or other suitable drier. After the addition of a suitable amount of water, the dye preparations can be used for dyeing, padding or printing from long to short bath. For dyeing from long baths, amounts of dye of up to about 100 grams per liter are generally used; for padding, up to about 150 grams or, preferably, 0.1 to 100 grams per liter; and for printing, up tp about 150 grams per kilogram of printing paste. The liquor ratio can vary within wide limits, for example from 1:2 to 1:100 or, preferably, from about 1:3 to 1:40. The known dyeing methods are used. Materials of linear aromatic polyesters can be dyed by the exhaustion method in the presence of carriers, for example 1- hydroxy-2-phenylbenzene, at temperatures of about 80° to 140° C., or in the absence of carriers at about 100° to 140° C. with pressure. They can also be padded or printed from aqueous dispersion and the padded or printed dye fixed by heat treatment at about 130° to 230° C., for example with water vapor, air or contact heat. The best results are obtained at fixing temperatures of 180° to 230° C. When dyeing is carried out by the exhaustion method at about 120° to 140° C. with pressure, fixation takes place in the dyebath itself.

The commonly used dispersing agents or mixture of dispersing agents, preferably those of anionic or non-ionic nature, are generally employed for the application of these dyes. Often about 0.5 gram of dispersing agent per liter of the dyeing medium is sufficient, although greater amounts, for example up to 5 grams per liter, can be used. Examples of known anionic dispersing agents suitable for use with the dyes are the condensation products of naphthalenesulphonic acids and formaldehyde, in particular dinaphthylmethane disulfphonate, the esters of sulphonated succinic acid, Turkey red oil, the alkaline salts of the sulphuric acid esters of fatty alcohols, for example sodium lauryl sulphate or sodium cetyl sulphate, sulphite cellulose waste liquor or its alkaline salts, soaps, and the alkali sulphates of the monoglycerides of fatty acids. Preferred non-ionic dispersing agents are the adducts of about 3 to 40 moles of ethylene oxide on alkylphenols, fatty alcohols, fatty amines or fatty acid amines, and their neutral sulphuric acid esters.

For padding and printing the normal thickening agents are used, for example natural products, such as starches, albumen, casein, alginates, gum tragacanth, gum Arabic or locust been gum, modified natural products, such as dextrins, British gum, crystal gum, cellulose alkylether, in particular methylether, cellulose ether carboxylic acids, or synthetic compounds, such as polyacrylates.

In the examples the parts and percentages are by weight and the temperatures in degrees centigrade.

EXAMPLE 1

A mixture of 60 parts of 1-amino-4-bromoanthraquinone, 350 parts of absolute ethyl alcohol, 22 parts of acrylamide and 70 parts of 100 percent sulphuric acid is heated at 80°–82°. Further additions of 12 parts of acrylamide are made after 2, 4 and 6 hours. The mixture is stirred for a further 6 hours at 80°–82° and cooled, at which time a solution of 20 parts of sodium hydroxide in 200 parts of water is added dropwise. The product settles out and is filtered off, washed with dilute ethyl alcohol and water, and dried.

A mixture of 40 parts of the 1-(2'-ethoxycarbonylethylamino)-4-bromoanthraquinone thus obtained, 30 parts of anhydrous potassium acetate, 29 parts of anthranilic acid, 2 parts of copper bronze and 400 parts of nitrobenzene is stirred for 6 hours at 130°. The mixture is filtered off while hot, the filter residue washed with 400 parts of benzene and then distilled in water vapor with the addition of 30 parts of 36 percent hydrochloric acid. The 1-(2'-ethoxycarbonylethylamino)-4(2''-carboxyphenyl-amino) anthraquinone thus formed settles out and is filtered off and dried.

20 parts of this dye are stirred in 250 parts of 85 percent poly-phosphoric acid at 70° until no further starting material is indicated, which is the case after about 4 hours. The solution is diluted with 200 parts of 85 percent phosphoric acid and run into 800 parts of cold water. The product, 2-(2'etho-carbonyl) ethylamino-3,4-phthaloylbenzacridone, is filtered off, washed with water until neutral and dried. It dissolves in chlorobenzene to give brilliant blue-green solutions.

DYEING EXAMPLE

A mixture of 1 part of the dye produced in accordance with Example 1, 1 part of sodium dinaphthylmethane disulphonate and 8 parts of water is ground until a fine dispersion is obtained. This is run into an emulsion of 3,000 parts of water and ten parts of 2-hydroxy-1,1'-diphenyl. At 40° 100 parts of a fabric of polyester fiber are entered into this dyebath. The bath is brought into the boil and the fabric dyed for 1 hour at the boil, after which it is rinsed, soaped and dried. The dyeing obtained is of brilliant blue-green shade and is fast to light, wet treatments, thermofixation, sublimation and pleating.

EXAMPLE 2

A mixture of 100 parts of 1-amino-4-bromoanthraquinone, 900 parts of 50 percent sulphuric acid and 64 parts of acrylamide is stirred for 14 hours at 80°–80°. The product is suctioned off hot, washed with water until neutral and dried. 92 parts of the 1-(2'-carboxyethylamino)-4-bromoanthraquinone thus formed are mixed with 1,000 parts of butanol, 60 parts of anthranilic acid, 90 parts of anhydrous potassium acetate and 2 parts of copper bronze. The mixture is stirred for 4 hours at 115°–118°, after which the product is suctioned off hot, washed washed with methyl alcohol, suspended in 1,000 parts of water, acidified, filtered, washed and dried.

A mixture of 80 parts of the resulting 1-(2'-carboxyethylamino)-''4,-(2''-carboxyphenylamino)anthraquinone and 400 parts of 85 percent polyphosphoric acid is stirred for 1 hour at 70°. It is then diluted with 400 parts of 85 percent phosphoric acid with cooling and run into 1,200 parts of water. The product is filtered off and washed until neutral.

A mixture of 40 parts of the 2-(2'-carboxyethylamino)-3,4-phthaloylbenzacridone thus obtained, 300 parts of ethylglycol and 40 parts of 100 percent sulphuric acid is stirred for 3 hours at 85°. On cooling, the final product is precipitated with 60 parts of 25 percent ammonia and 200 parts of water, filtered off and dried. It is the dye 2-(2'-ethoxyethoxycarbonyl)-ethylamino-3,4-phthaloylbenzacridone, which dyes polyester fibers in brilliant greenish blue shades.

EXAMPLE 3

108 parts of 1-amino-4-(2'-carboxyphenylamino)anthraquinone (produced by condensation of 1-amino-4-bromoanthraquinone and anthranilic acid) are entered into 500 parts of chlorosulphonic acid and stirred for 15 hours at 20°–25°. The temperature is then increased to 50° and 242 parts of 65 percent sulphuric acid and then 54 parts of water are added. The temperature of the mixture is raised to 80° and, at this temperature, 75 parts of acrylic acid are added dropwise in 3 hours. Stirring is continued for a further 2 hours at 80°, after which the mixture is slowly diluted with 500 parts of water at 80°. On cooling to 20°, the separated sulphate is filtered off and washed with 700 parts of 45 percent sulphuric acid. It is then suspended in 800 parts of hot water containing 40 parts of pyridine and the temperature raised to 80°. A powerful jet of air is directed through the suspension for ten hours. After this time the product is filtered off hot, washed with hot water and dried. A mixture of 80 parts of the resulting 2-(2'-carboxyethylamino)-3,4-phthaloyl benzacridone, 220 parts of isopropyl alcohol and 18 parts of sulphuric acid monohydrate is stirred for 4 hours at 100°. On cooling, the precipitated ester is filtered off, washed with methyl alcohol and water, and dried. It dissolves in chlorobenzene with a blue-green color.

The dyes of formula (I) listed in the following table may be produced in accordance with the procedures of Examples 1, 2 or 3.

| Example | A in 1' | A in 2' | R | Color in chlorobenzene |
| --- | --- | --- | --- | --- |
| 4 | H | H | Methyl | Blue-green |
| 5 | H | CH$_3$ | n-Propyl | Blue-green |
| 6 | CH$_3$ | H | n-Butyl | Blue-green |
| 7 | H | H | iso-Butyl | Blue-green |
| 8 | H | H | Cyclohexyl | Blue-green |
| 9 | H | H | 2-Hydroxyethyl | Blue-green |
| 10 | H | H | 2-(2-Methoxyethoxy)-ethyl | Blue-green |
| 11 | H | H | Benzyl | Blue-green | formulae of representative dyes of the foregoing examples are as follows:

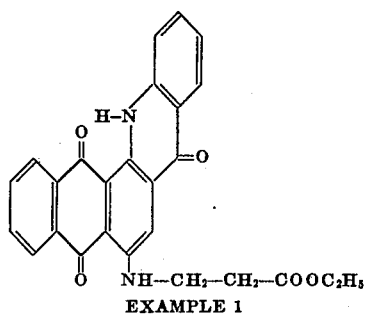
EXAMPLE 1

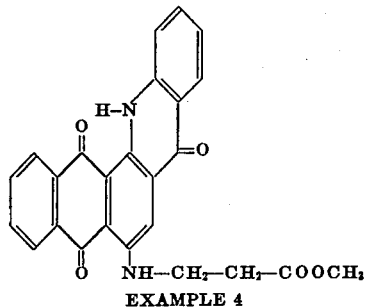
EXAMPLE 4

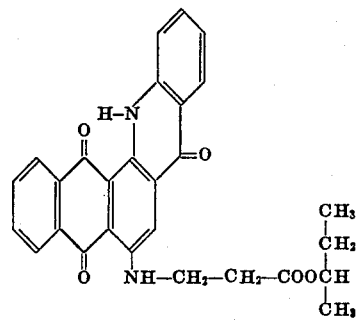
EXAMPLE 7

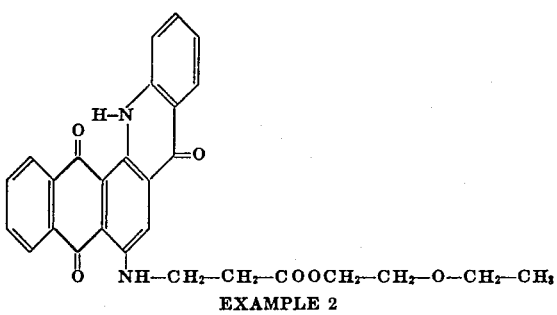
EXAMPLE 2

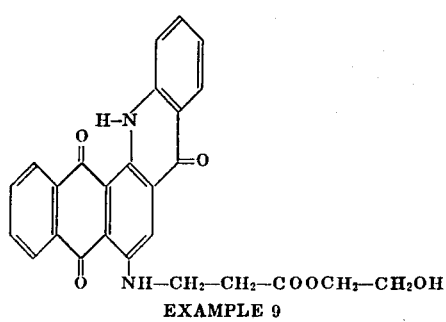
EXAMPLE 9

Having thus disclosed the invention what we claim is:

1. A phthaloylbenzacridone dye of the formula

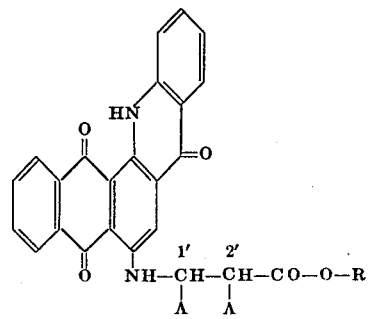

wherein
R is a member selected from the group consisting of a hydrogen atom, cyclohexyl, unsubstituted lower alkyl and substituted lower alkyl, any substituent of substituted lower alkyl being a member selected from the group consisting of hydroxy, lower alkoxy, lower alkoxyalkoxy and phenyl;
one A is a hydrogen atom; and
the other A is a member selected from the group consisting of a hydrogen atom and methyl.

2. A phthaloylbenzacridone dye according to claim 1 wherein R is a member selected form the group consisting of a hydrogen atom, unsubstituted alkyl having from one to six carbon atoms and substituted alkyl, the alkyl of which has from one to six carbon atoms; any substituent of substituted alkyl being a member selected from the group consisting of alkoxy with from one to four carbon atoms, alkoxyalkoxy with from two to four carbon atoms and phenyl.

3. A phthaloylbenzacridone dye according to claim 1 wherein A in the 1'-position is methyl.

4. A phthaloylbenzacridone dye according to claim 1 wherein A in the 2'-position is methyl.

5. A phthaloylbenzacridone dye according to claim 1 wherein R is a hydrogen atom.

6. A phthaloylbenzacridone dye according to claim 1 wherein R is lower alkoxy (lower) alkyl.

7. A phthaloylbenzacridone dye according to claim 1 wherein R is lower alkoxyalkoxy(lower)alkyl.

8. A phthaloylbenzacridone dye according to claim 1 wherein R is phenyl(lower)alkyl.

9. A phthaloylbenzacridone dye according to claim 1 wherein R is cyclohexyl.

10. The dyestuff according to claim 1 of the formula

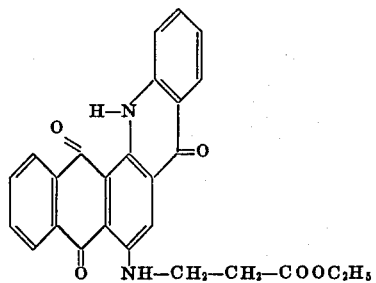

11. The dyestuff according to claim 1 of the formula

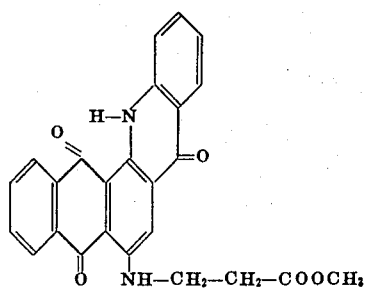

12. The dyestuff according to claim 1 of the formula
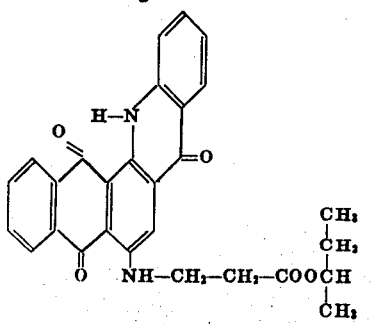
13. The dyestuff according to claim 1 of the formula
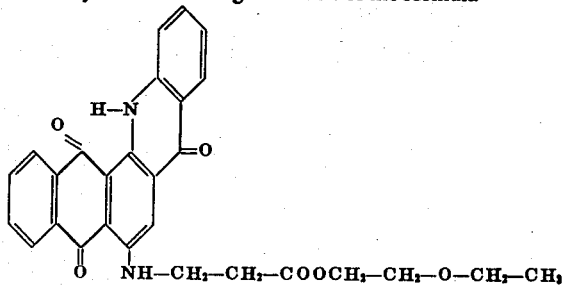
14. The dyestuff according to claim 1 of the formula
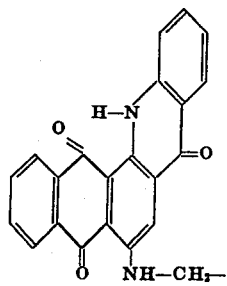
* * * * *